United States Patent
Pan et al.

(10) Patent No.: US 8,514,522 B1
(45) Date of Patent: Aug. 20, 2013

(54) SYSTEMS FOR INTERCONNECTING MAGNETIC HEADS OF STORAGE DEVICES IN A TEST ASSEMBLY

(75) Inventors: Tzong-Shii Pan, San Jose, CA (US); Gunphai Prateepphaisan, Ayutthaya (TH); Tahir A. Ali, Fremont, CA (US); Greg R. Knodel, San Jose, CA (US); Adisak Tokaew, Mahasarakham (TH); Wayne Bonin, Saint Paul, MN (US)

(73) Assignee: Western Digital (Fremont), LLC, Fremont, CA (US)

( * ) Notice: Subject to any disclaimer, the term of this patent is extended or adjusted under 35 U.S.C. 154(b) by 386 days.

(21) Appl. No.: 13/013,289

(22) Filed: Jan. 25, 2011

(51) Int. Cl.
  *G11B 5/48* (2006.01)
(52) U.S. Cl.
  USPC .................................. 360/245.3; 324/755.01
(58) Field of Classification Search
  USPC ............ 360/234.5, 244.8, 245.3; 324/755.01
  See application file for complete search history.

(56) References Cited

U.S. PATENT DOCUMENTS

| | | | |
|---|---|---|---|
| 6,459,260 B1 | 10/2002 | Bonin et al. | |
| 6,903,543 B2 | 6/2005 | Boutaghou et al. | |
| 6,943,971 B2 | 9/2005 | Kainuma et al. | |
| 7,165,462 B2 | 1/2007 | Luo et al. | |
| 7,355,393 B2 | 4/2008 | Tokutomi et al. | |
| 7,368,905 B2 | 5/2008 | Grinberg et al. | |
| 7,453,670 B2 | 11/2008 | Takanuki et al. | |
| 7,471,081 B2 | 12/2008 | Kainuma et al. | |
| 7,497,006 B2 | 3/2009 | Davis et al. | |
| 7,719,796 B2 | 5/2010 | Takahashi et al. | |
| 7,859,793 B2 * | 12/2010 | Uematsu et al. | 360/234.6 |
| 8,089,730 B1 | 1/2012 | Pan et al. | |
| 8,134,804 B2 * | 3/2012 | Honzawa et al. | 360/245.3 |
| 2006/0072245 A1 * | 4/2006 | Motonishi et al. | 360/234.5 |
| 2006/0112770 A1 | 6/2006 | Luo et al. | |
| 2006/0236527 A1 | 10/2006 | Davis et al. | |
| 2007/0046286 A1 | 3/2007 | Umezaki et al. | |
| 2007/0263325 A1 | 11/2007 | Hanya et al. | |
| 2009/0251825 A1 | 10/2009 | Honzawa et al. | |

* cited by examiner

*Primary Examiner* — Angel Castro

(57) ABSTRACT

Systems for interconnecting magnetic heads of storage devices in a test assembly are provided. In one embodiment, the invention relates to a probe assembly for coupling a read head to a cavity gimbal assembly, the probe assembly including a plurality of conductive probes each including a body section including two substantially flat side surfaces and a bottom surface including a pad configured to be soldered to a corresponding pad of a laminated flexure of the cavity gimbal assembly, a spring section including an elongated arm extending away from the body section, the elongated arm shaped to make conductive contact with a pad on a trailing face of the read head, and a non-conductive adhesive layer attached to at least one of the two side surfaces, where each of the plurality of the conductive probes is attached to an adjacent one of the conductive probes by one of the adhesive layers.

23 Claims, 8 Drawing Sheets

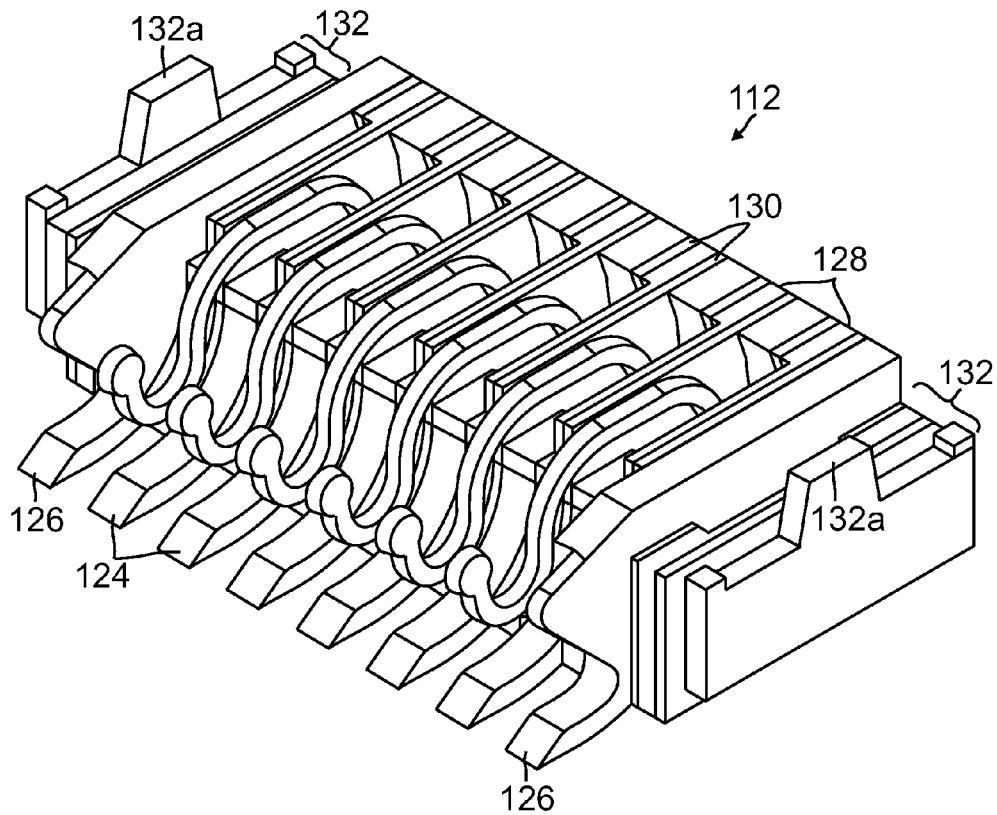
FIG. 4
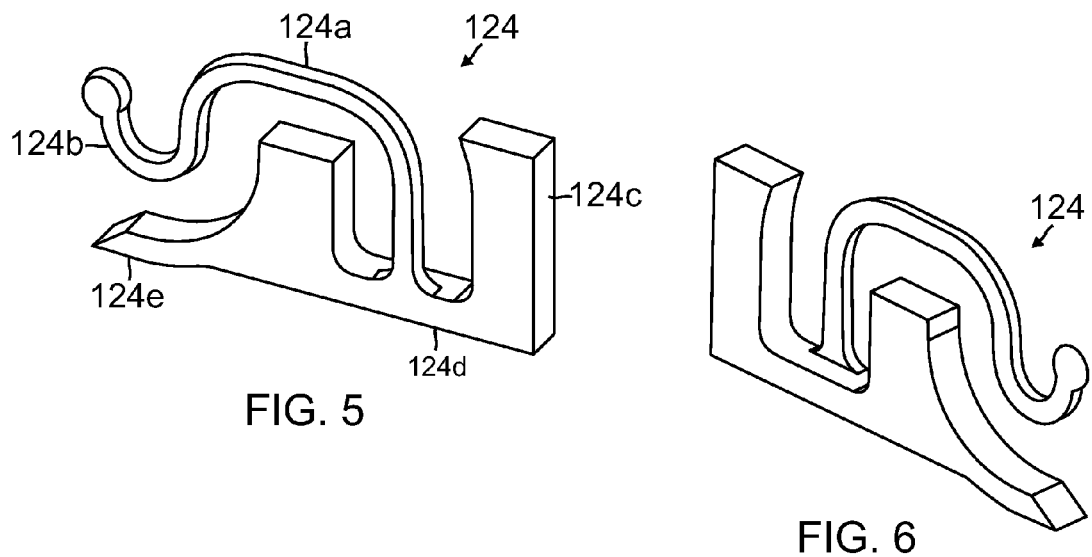
FIG. 5
FIG. 6

SYSTEMS FOR INTERCONNECTING MAGNETIC HEADS OF STORAGE DEVICES IN A TEST ASSEMBLY

FIELD

The present invention relates to information storage devices, and more specifically to systems for interconnecting magnetic heads of the storage devices in a test assembly.

BACKGROUND

Information storage devices use magnetic media to store data and a movable slider having a read/write head positioned over the magnetic media to selectively read data from and write data to the magnetic media. A magnetic hard disk drive is an example of one such information storage device that includes one or more heads that can both read and write, but other information storage devices also include heads and sometimes including heads that cannot write. All of these types of heads will be referred to as "read heads" herein.

In a modern magnetic hard disk drive device, each read head is a sub-component of a head-gimbal assembly (HGA). The HGA also includes a suspension assembly for holding the read head and providing a plurality of electrical connections thereto. The suspension assembly typically includes a fragile laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

The read head is typically permanently bonded to a tongue portion of the fragile laminated flexure by an adhesive, for example by an epoxy adhesive. Accordingly, if it is discovered that the read head is faulty after HGA assembly, the suspension assembly will typically be wasted because often the permanent bond cannot be broken without damaging the fragile laminated flexure.

Therefore, it is desirable to test the function of the read head prior to HGA assembly, so that if the read head is determined to be faulty it may be discarded or repaired prior to permanent bonding to a suspension assembly. Such functional testing (e.g. so-called "dynamic electrical test" or "DET") is more accurate if the testing conditions more closely resemble the actual conditions during operation of the information storage device. For example, the accuracy of the functional testing may be improved by holding and electrically connecting the read head using a suspension assembly that is similar to the type of suspension assembly to which the read head will be bonded if its function is deemed acceptable. Existing interconnects for DET systems can be expensive and can have less than desirable performance. As such, as improved system for interconnecting the magnetic heads/sliders is needed.

SUMMARY

Aspects of the invention relate to systems for interconnecting magnetic heads of the storage devices in a test assembly. In one embodiment, the invention relates to a probe assembly for coupling a read head to a cavity gimbal assembly, the probe assembly including a plurality of conductive probes each including a body section including two substantially flat side surfaces and a bottom surface including a pad configured to be soldered to a corresponding pad of a laminated flexure of the cavity gimbal assembly, a spring section including an elongated arm extending away from the body section, the elongated arm shaped to make conductive contact with a pad on a trailing face of the read head, and a non-conductive adhesive layer attached to at least one of the two side surfaces, where each of the plurality of the conductive probes is attached to an adjacent one of the conductive probes by one of the adhesive layers.

In another embodiment, the invention relates to a cavity gimbal assembly for receiving a read head and providing a plurality of electrical connections thereto, the suspension assembly including a load beam, a laminated flexure attached to the load beam and including a plurality of conductive traces positioned on a top surface of the laminated flexure, a cavity probe assembly including a rectangularly shaped opening for receiving the read head, the opening defined by a read head clamp attached to the laminated flexure, the read head clamp including a first cantilevered clamping arm having a first arm supported end and a first arm distal end, the first cantilevered clamping arm being sized so that the first arm distal end is positioned to contact a leading face of the read head, and a first wall positioned to face a trailing face of the read head, a plurality of conductive probes attached to the first wall, each conductive probe including a body section including two substantially flat side surfaces and a bottom surface including a pad configured to be soldered to a pad coupled to one of the conductive traces of the laminated flexure, a spring section including an elongated arm extending away from the body section, the elongated arm shaped to make conductive contact with a pad positioned on the trailing face of the read head, and a non-conductive adhesive layer attached to at least one of the two side surfaces, where each of the plurality of the conductive probes is attached to an adjacent one of the conductive probes by one of the adhesive layers.

BRIEF DESCRIPTION OF THE DRAWINGS

FIG. 4 is a perspective view of a probe assembly including a number of conductive probes coupled together in accordance with one embodiment of the invention.

FIG. 5 is a rear perspective view of a probe of the probe assembly of FIG. 4 in accordance with one embodiment of the invention.

FIG. 6 is front perspective view of the probe of FIG. 5 in accordance with one embodiment of the invention.

DETAILED DESCRIPTION

Figure 1:
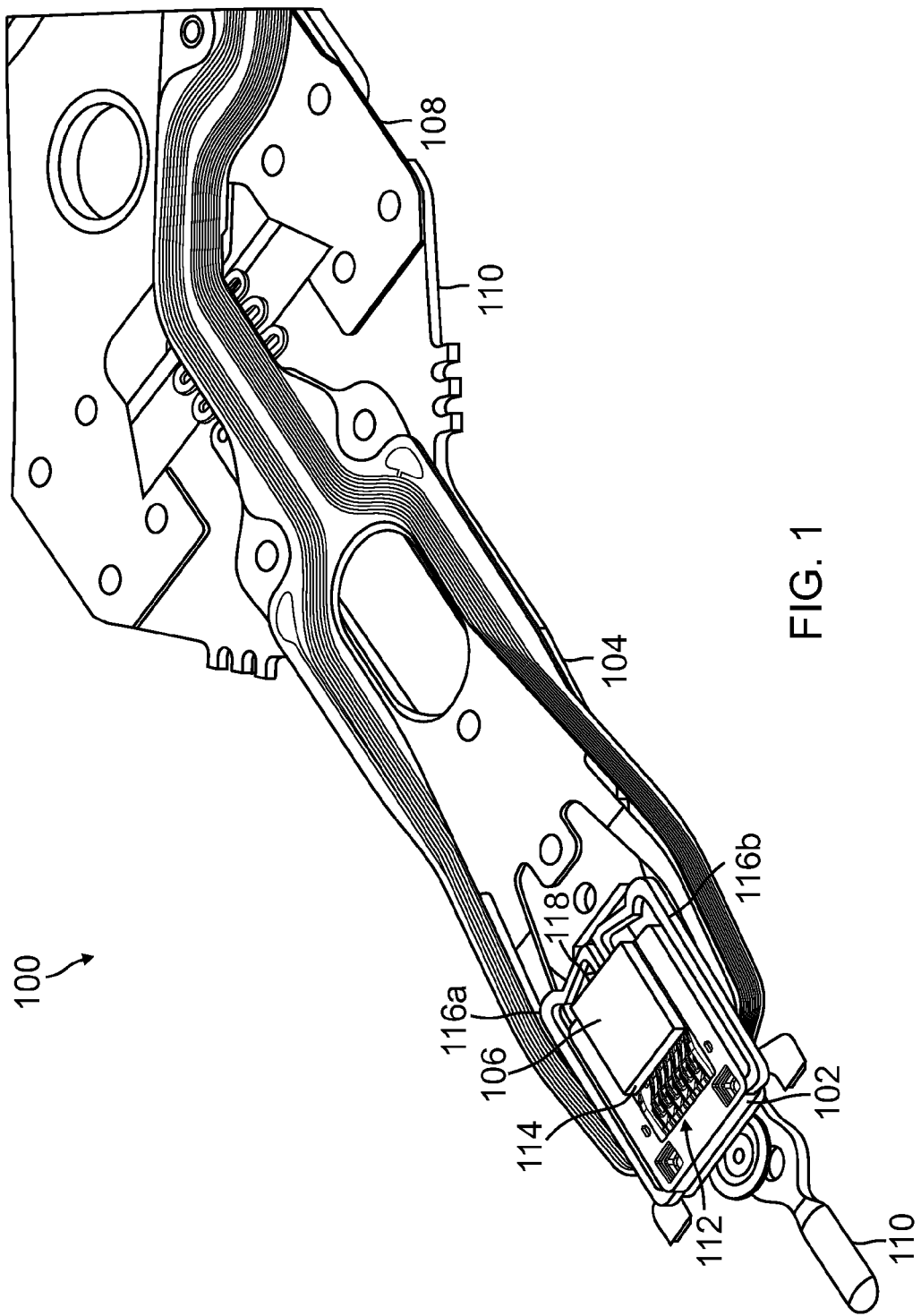
FIG. 1 is a perspective view of a suspension assembly including a cavity probe assembly mounted on a laminated flexure with a read head positioned within the cavity probe assembly in accordance with one embodiment of the invention.

Referring now to the drawings, embodiments of cavity gimbal assemblies and probe assemblies for receiving read heads and providing electrical connections thereto for an electrical test assembly are illustrated. In several embodiments, the probe assemblies include a number of conductive probes each having a body section and a spring arm section where the conductive probes are attached to one another by non-conductive adhesive layers applied to sides of the body sections. In some embodiments, the cavity gimbal assemblies include a laminated flexure coupled to a cavity probe assembly including a rectangularly shaped opening for receiving a read head. In such case, one of the probe assemblies is mounted within the opening to enable electrical coupling to a leading face of the read head when it is inserted into the rectangular shaped opening. A pair of cantilevered clamping arms can form the rectangular opening and also act as a spring retainer to apply pressure to a leading face of the read head when it is inserted into the rectangular shaped opening.

FIG. 1 is a perspective view of a suspension assembly 100 including a cavity probe assembly 102 mounted on a laminated flexure 104 with a read head 106 positioned within the cavity probe assembly in accordance with one embodiment of the invention. The suspension assembly 100 further includes a suspension mounting plate 108 attached to a load beam 110 that extends along and supports the laminated flexure 104. The suspension mounting plate 108 can be coupled to a central assembly that is part of a dynamic electrical test assembly, where the central assembly often support one or more of the suspension assemblies.

The cavity probe assembly 102 includes a probe assembly 112 including a number of conductive probes mounted within a rectangular opening for receiving the read head/slider 106. Spring arms or leads from the probe assembly 112 extend toward and make electrical contact with pads on a trailing face 114 of the slider 106. The cavity probe assembly 102 further includes first and second cantilevered clamping arms (116a, 116b) having ends that effectively form a spring configured to retain the slider 106 in the rectangular opening by contacting a leading face 118 of the slider 106 and directing a retaining force toward the probe assembly 112.

Figure 2:
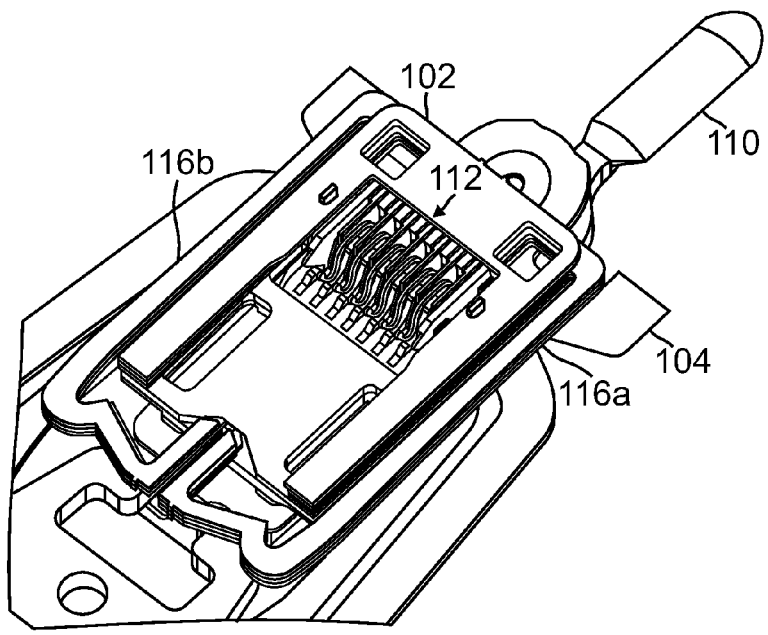
FIG. 2 is a perspective view of the cavity probe assembly of FIG. 1 mounted on the laminated flexure in accordance with one embodiment of the invention.

FIG. 2 is a perspective view of the cavity probe assembly 102 of FIG. 1 mounted on the laminated flexure 104 in accordance with one embodiment of the invention. The probe assembly 112 includes six central probes and two end probes having pads (not visible) on bottom surfaces thereof. The pads for each of the probes in the probe assembly 112 are soldered to corresponding pads on the flexure 104. In other embodiments, the probe assembly can include more than or less than 8 probes. In some embodiments, the central probes and end probes are identical.

Figure 3:
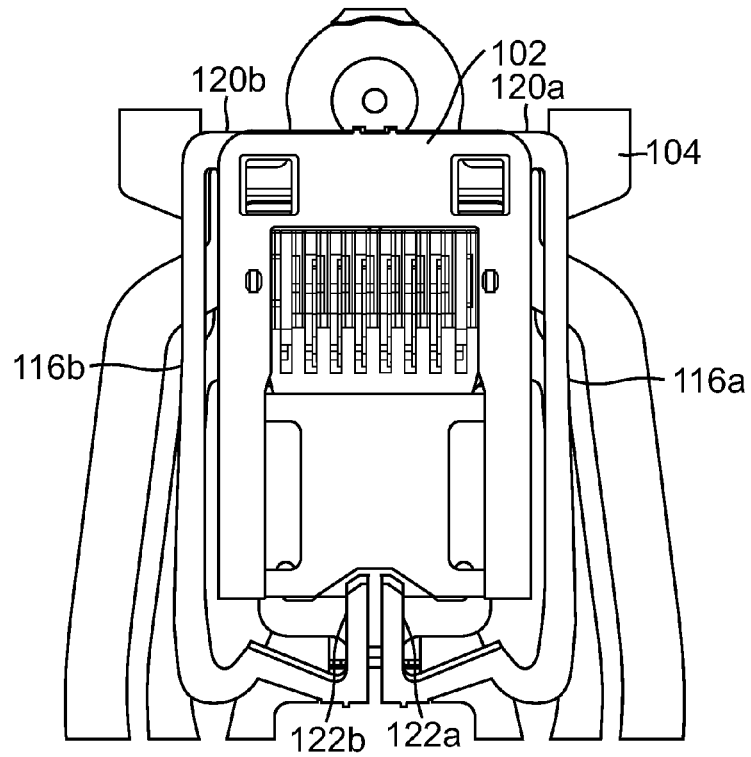
FIG. 3 is a top view of the cavity probe assembly of FIG. 2 mounted on the laminated flexure in accordance with one embodiment of the invention.

FIG. 3 is a top view of the cavity probe assembly 102 of FIG. 2 mounted on the laminated flexure 104 in accordance with one embodiment of the invention. The cavity probe assembly 102 includes the first cantilevered clamping arm 116a and the second cantilevered clamping arm 116b. The first cantilevered clamping arm 116a includes a first arm supporting end 120a and a first arm distal end 122a. The first cantilevered clamping arm 116a may be sized so that the first arm distal end 122a is positioned to contact the leading face 114 of the read head 106 (see FIG. 1). Similarly, the second cantilevered clamping arm 116b includes a second arm supporting end 120b and a second arm distal end 122b. The second cantilevered clamping arm 116b may be sized so that the second arm distal end 122b is positioned to contact the leading face 114 of the read head 106 (see FIG. 1).

FIGS. 1-3 illustrate the cantilevered clamping arms having a particular shape. In other embodiments, the cantilevered clamping arms can take other shapes suitable to provide a retaining force on the leading face of the read head.

FIG. 4 is a perspective view of the probe assembly 112 including a number of conductive probes coupled together in accordance with one embodiment of the invention. The probe assembly 112 includes six central probes 124 and two end probes 126. The probe assembly 112 further includes spacers 128 positioned between each of the probes (124, 126). The spacers 128 have non-conductive adhesive layers 130 bonded on either side of the spacers 128 to electrically isolate adjacent probes. The probe assembly 112 further includes two end alignment units 132 for attaching to interior walls of the cavity probe assembly 102 (see FIGS. 1-3). The alignment units 132 each include a trapezoidal protrusion 132a for aligning the probe assembly 112 with the cavity probe assembly 102 (see FIGS. 1-3). Each of the trapezoidal protrusions 132a is configured to extend into corresponding openings positioned on the cavity probe assembly 102 (see FIGS. 1-3).

Each of the probes (124, 126) has a flat rear surface for attaching to a wall of the cavity probe assembly 102 and a flat bottom. In several embodiments, the shape of the flat bottom provides desirable aerodynamic characteristics that closely reflect those characteristics associated with equivalent structures for an actual head gimbal assembly of a storage drive. Each of the central probes 124 includes an elongated arm for making conductive contact with the trailing face of the read head. Similarly, each of the end probes 126 has a protrusion extending toward and for making conductive contact with the trailing face of the read head.

In several embodiments, the probes are made of a beryllium copper. In other embodiments, the probes can be made of other suitable conductive materials. In several embodiments, the spacers are made of polymer materials or other suitable non-conductive materials.

FIG. 5 is a rear perspective view of a central probe 124 of the probe assembly 112 of FIG. 4 in accordance with one embodiment of the invention. The central probe 124 includes an elongated arm 124a having an end with a curved shape 124b, a flat rear surface 124c, a substantially flat bottom surface 124d, and a lead end 124e extending along the bottom surface 124d for attachment to a pad on the flexure.

In several embodiments, the design of the elongated spring arm 124a and curved end 124b can address challenges associated with probe design in a slider testing environment. For example, these components can allow for substantial deflection of the spring arm while taking up minimal space. In addition, these components can address concerns associated with space constraints and tight tolerances where conventional probes are generally deficient.

FIG. 6 is front perspective view of the central probe 124 of FIG. 5 in accordance with one embodiment of the invention.

Figure 7:
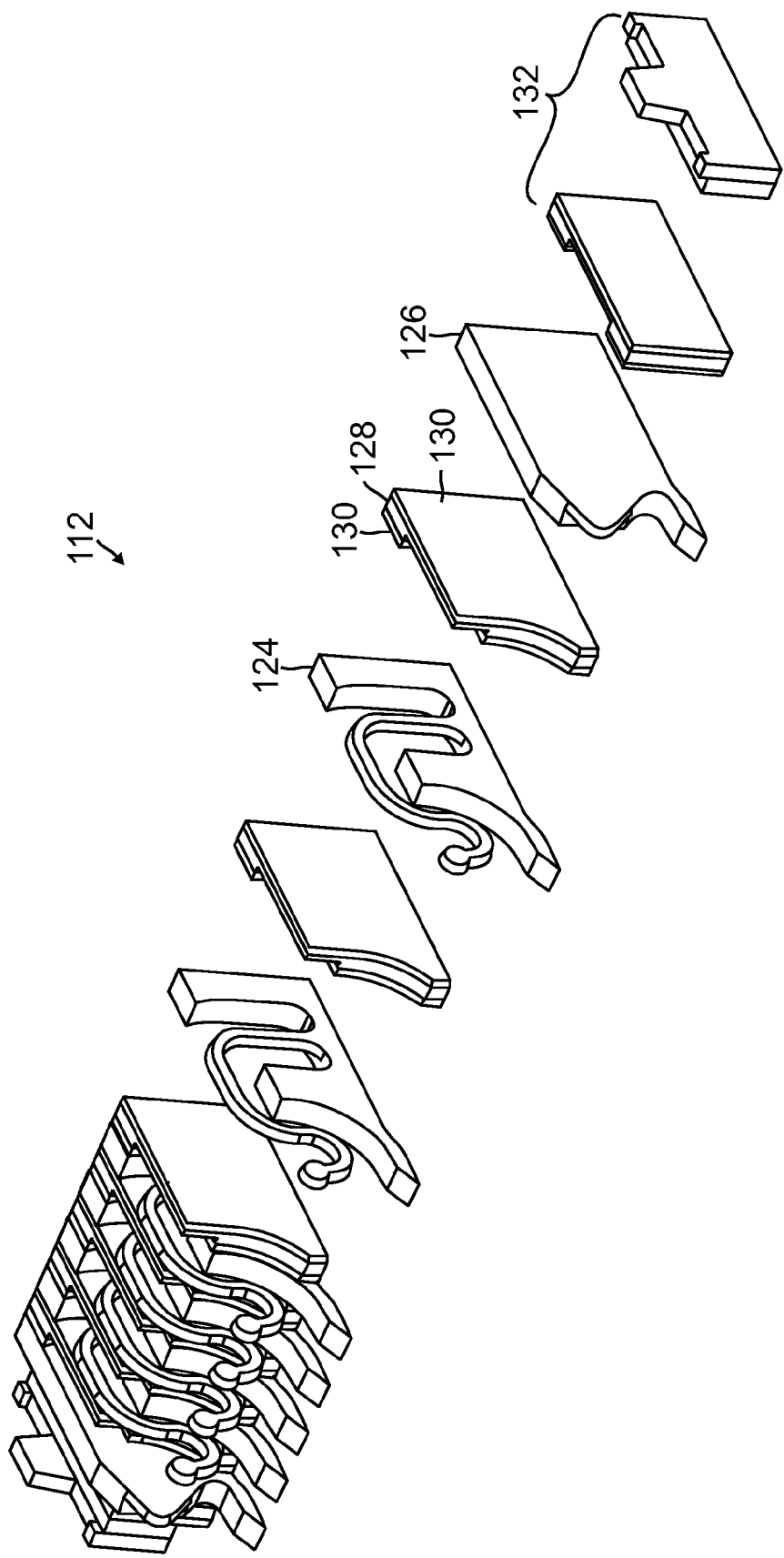
FIG. 7 is an exploded perspective view of the probe assembly of FIG. 4 including a number of spacers and adhesive layers in accordance with one embodiment of the invention.

FIG. 7 is an exploded perspective view of the probe assembly 112 of FIG. 4 including a number of spacers 128 and adhesive layers 130 in accordance with one embodiment of the invention.

Figure 8:
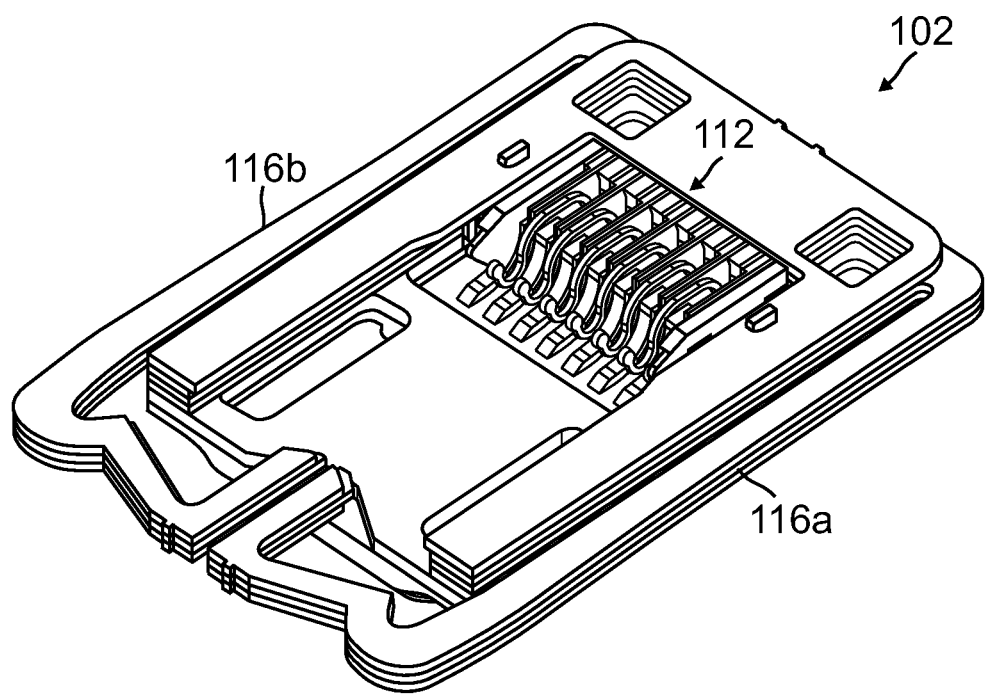
FIG. 8 is a perspective view of the cavity probe assembly of FIG. 1 in accordance with one embodiment of the invention.

FIG. 8 is a perspective view of the cavity probe assembly 102 of FIG. 1 in accordance with one embodiment of the invention.

Figure 9:
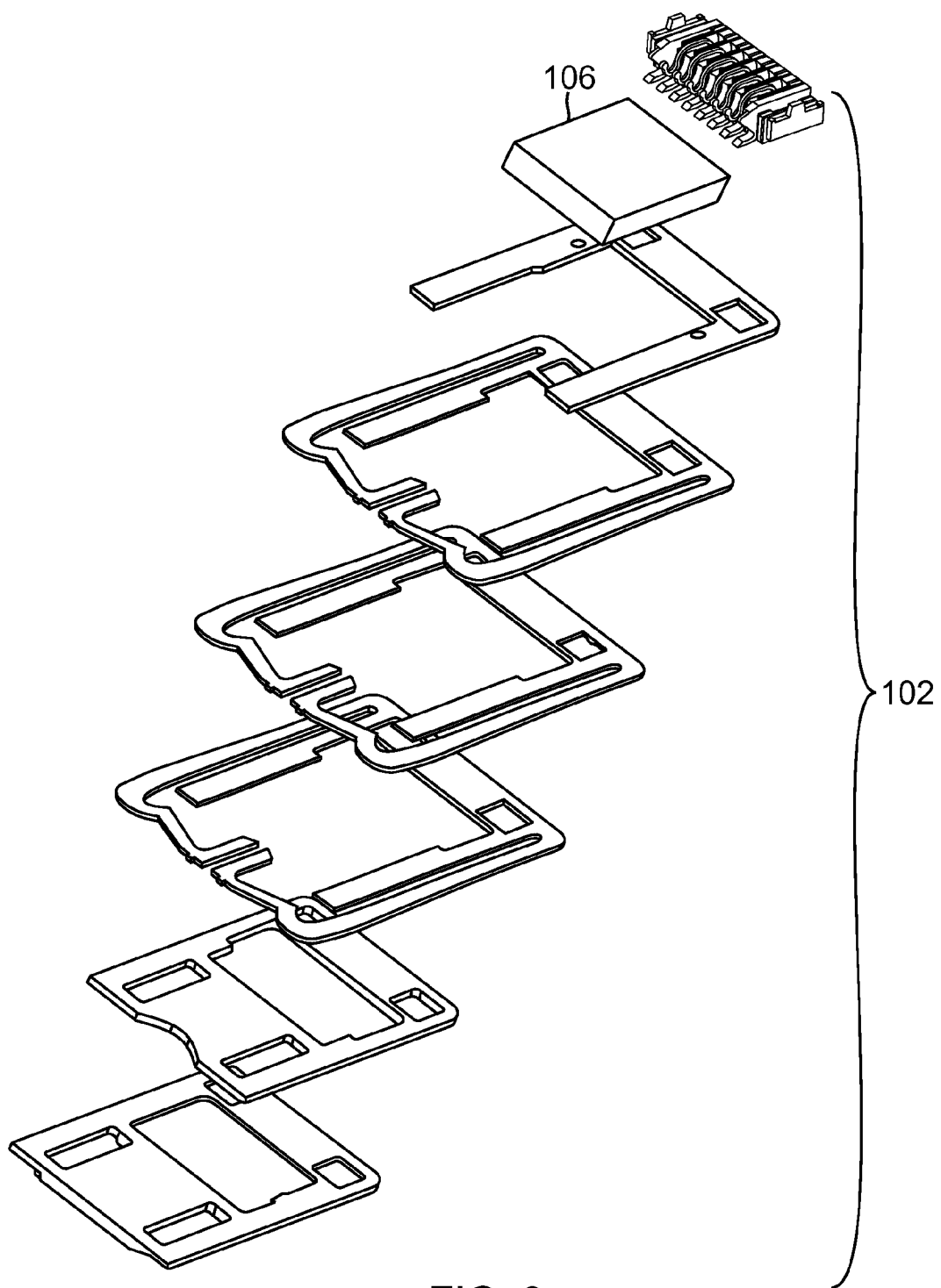
FIG. 9 is an exploded perspective view of the cavity probe assembly of FIG. 8 and a slider in accordance with one embodiment of the invention.

FIG. 9 is an exploded perspective view of the cavity probe assembly 102 of FIG. 8 and a slider 106 in accordance with one embodiment of the invention. The cavity probe assembly 102 includes six layers that are configured to be bonded together using any number of methods known in the art. In several embodiments, all of the layers are made of metallic materials. In one such embodiment, all of the layers are made of beryllium copper. In other embodiments, the layers can be made of other suitable materials. Three of the six layers form a retaining spring that includes the first and second cantilevered clamping arms while the additional layers provide support to the cavity probe structure. In some embodiments, the additional layers not forming the cantilevered clamping arms can be made of polymer materials.

While not bound by any particular theory, it is believed that this multi-layered structure allows for desirable head characteristics that closely reflect the head characteristics associated with equivalent structures of a production head gimbal assembly of a storage drive. Similarly, it is believed that the structure of the cavity probe assembly and flexure allow for head characteristics that substantially match (e.g., about match) the head characteristics associated with equivalent structures of a production head gimbal assembly of a storage drive. In such case, these structures can allow for near perfect modeling and testing of sliders.

Figure 10:
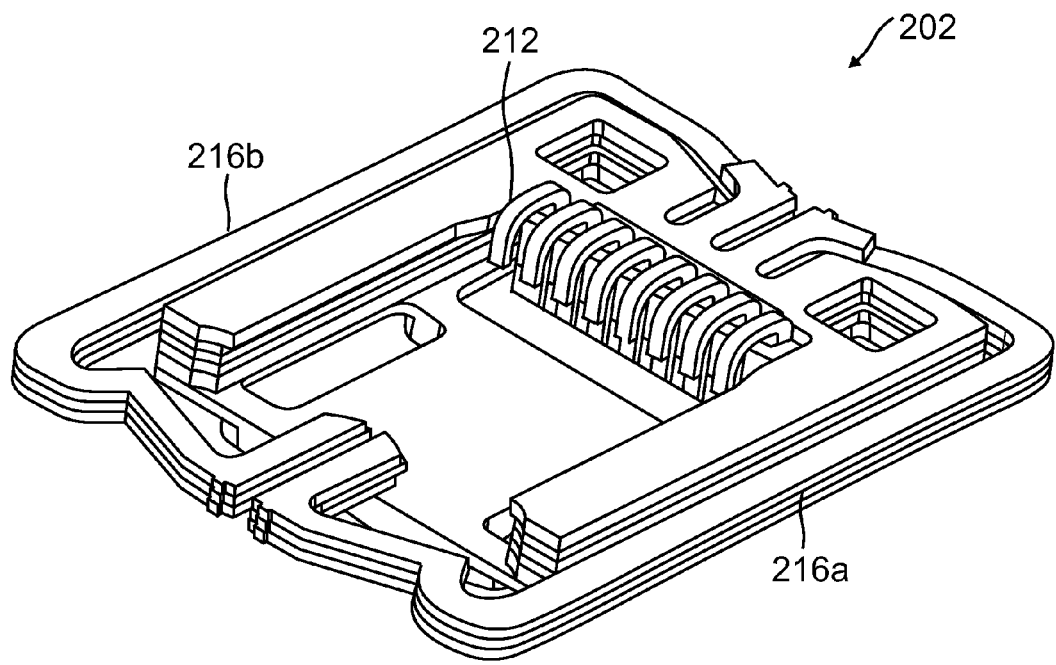
FIG. 10 is a perspective view of a cavity probe assembly with another probe assembly in accordance with one embodiment of the invention.

FIG. 10 is a perspective view of a cavity probe assembly 202 with another probe assembly 212 in accordance with one embodiment of the invention. The cavity probe assembly 202 includes first and second cantilevered clamping arms (216a, 216b) and the probe assembly 212 including probes having a varied shape as compared to the probes described above.

Figure 11:
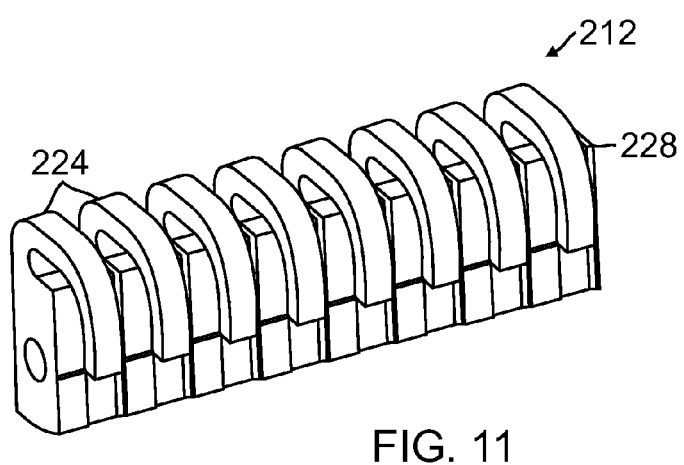
FIG. 11 is a perspective view of the probe assembly of FIG. 10 including a number of conductive probes coupled together in accordance with one embodiment of the invention.

FIG. 11 is a perspective view of the probe assembly 212 of FIG. 10 including a number of conductive probes 224 coupled together in accordance with one embodiment of the invention. The probe assembly 212 includes a number of spacers 228 positioned between the probes 224. In several embodiments, the spacers 228 are made of non-conductive materials. In some embodiments, the spacers 228 are made of a non-conductive adhesive material.

Figure 12:
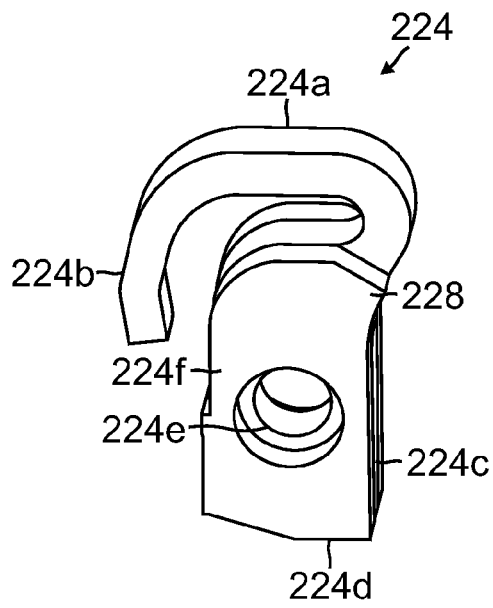
FIG. 12 is a perspective view of one probe of the probe assembly of FIG. 11 in accordance with one embodiment of the invention.

FIG. 12 is a perspective view of one probe 224 of the probe assembly 212 of FIG. 11 in accordance with one embodiment of the invention. The probe 224 includes a body section 224f and an elongated spring arm 224a (e.g., cantilevered arm) having an end with a curved shape 224b. The probe 224 also includes a substantially flat rear surface 224c for being attached to a wall of a cavity probe assembly and a substantially flat bottom surface 224d for being soldered to a pad on the cavity probe assembly. The probe 224 further includes an alignment hole 224e for aligning one or more probes during assembly of the probe assembly using an alignment shaft that can extend into the alignment holes. In some embodiments, the spacer 228 includes adhesive layers added to one or more surfaces of the spacer for attachment to the probe(s).

Figure 13:
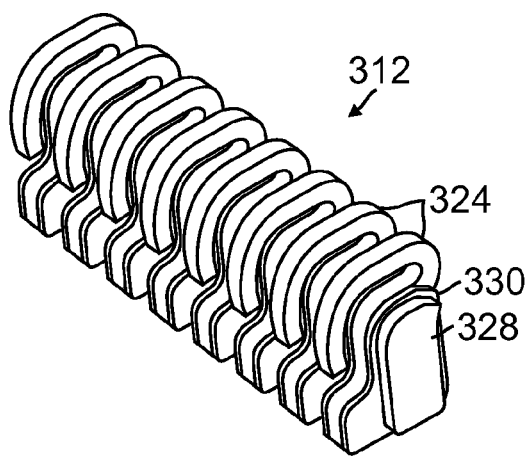
FIG. 13 is a perspective view of another probe assembly including a number of conductive probes coupled together in accordance with one embodiment of the invention.

FIG. 13 is a perspective view of another probe assembly 312 including a number of conductive probes 324 coupled together in accordance with one embodiment of the invention. The probe assembly 312 further includes a number of spacers 328 attached to adhesive layers 330 and positioned between the probes 324 and at the ends of the outermost probes 324.

Figure 14:
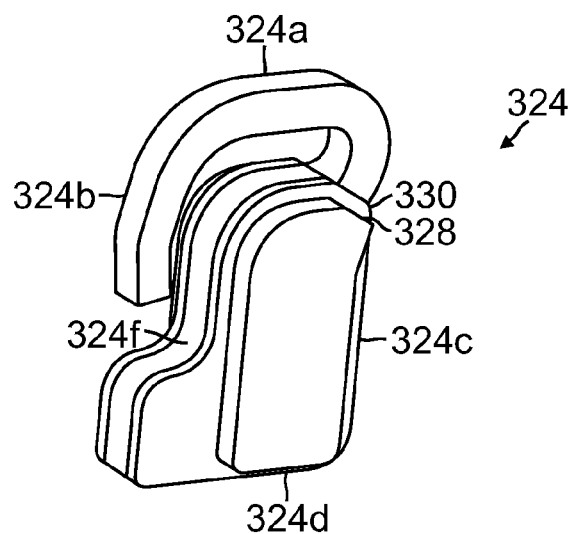
FIG. 14 is a perspective view of one probe of the probe assembly of FIG. 13 in accordance with one embodiment of the invention.

FIG. 14 is a perspective view of one probe 324 of the probe assembly 312 of FIG. 13 in accordance with one embodiment of the invention. The probe 324 includes a body section 324f and an elongated spring arm 324a having an end with a curved shape 324b. The probe 324 also includes a substantially flat rear surface 324c for being attached to a wall of a cavity probe assembly and a substantially flat bottom surface 324d for being soldered to a pad on the cavity probe assembly. The probe 324 further includes an adhesive layer 330 attached to front and rear side surfaces of the body section 324f. Spacers 328 are attached to each of the adhesive layers 330.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In several of the embodiments described above, the probe assemblies have 8 probes. In some embodiments, the probe assemblies can have 6 probes. In other embodiments, the probe assemblies can have any number of probes.

What is claimed is:

1. A probe assembly for coupling a read head to a cavity gimbal assembly, the probe assembly comprising:
 a plurality of conductive probes each comprising:
  a body section comprising two substantially flat side surfaces and a bottom surface comprising a pad configured to be soldered to a corresponding pad of a laminated flexure of the cavity gimbal assembly;
  a spring section comprising an elongated arm extending away from the body section, the elongated arm shaped to make conductive contact with a pad on a trailing face of the read head; and
  a non-conductive adhesive layer attached to at least one of the two side surfaces,
 wherein each of the plurality of the conductive probes is attached to an adjacent one of the conductive probes by one of the adhesive layers.

2. The probe assembly of claim 1, wherein each of the conductive probes is separated from an adjacent one of the conductive probes by a spacer.

3. The probe assembly of claim 1, wherein the probe assembly is configured to mount to a cavity probe assembly.

4. The probe assembly of claim 3, wherein the cavity probe assembly comprises a rectangularly shaped opening for the read head.

5. The probe assembly of claim 4:
 wherein the rectangularly shaped opening comprises an open top, a bottom, two long side walls, a short side wall opposite to a first distal end and a second distal end of a first cantilevered clamping arm and a second cantilevered clamping arm;
 wherein the probe assembly is configured to mount to the short side wall.

6. The probe assembly of claim 5:
 wherein the probe assembly is configured to mount to the short side wall such that the spring section of each probe extends away from the short side wall.

7. The probe assembly of claim 6:
 wherein the cavity probe assembly comprises the first cantilevered clamping arm having a first arm supported end and the first arm distal end, the first cantilevered clamping arm being sized so that the first arm distal end is positioned to contact a leading face of the read head; and wherein a portion of the spring section of each probe is configured to make electrical contact with a pad on the trailing face of the read head.

8. The probe assembly of claim 7:
wherein the cavity probe assembly comprises the second cantilevered clamping arm having a second arm supported end and the second arm distal end, the second cantilevered clamping arm being sized so that the second arm distal end is positioned to contact the leading face of the read head.

9. The probe assembly of claim 1, wherein the body section of each of the probes comprises an opening configured to receive an alignment shaft.

10. The probe assembly of claim 9, wherein the opening comprises a circular shape.

11. The probe assembly of claim 1, wherein each of the probes is soldered to the laminated flexure of the cavity gimbal assembly, and wherein each of the probes is mounted within a cavity probe assembly of the cavity gimbal assembly.

12. The probe assembly of claim 1, wherein the elongated arm comprises an end having a curved shape, the end configured to make the conductive contact with the pad on the trailing face of the read head.

13. The probe assembly of claim 1, further comprising two conductive end probes each comprising a rectangularly shaped body having a protrusion configured to make electrical contact with a pad on a trailing face of the read head.

14. A cavity gimbal assembly for receiving a read head and providing a plurality of electrical connections thereto, the assembly comprising:
a load beam;
a laminated flexure attached to the load beam and comprising a plurality of conductive traces positioned on a top surface of the laminated flexure;
a cavity probe assembly comprising:
a rectangularly shaped opening for receiving the read head, the opening defined by a read head clamp attached to the laminated flexure, the read head clamp comprising:
a first cantilevered clamping arm having a first arm supported end and a first arm distal end, the first cantilevered clamping arm being sized so that the first arm distal end is positioned to contact a leading face of the read head; and
a first wall positioned to face a trailing face of the read head;
a plurality of conductive probes attached to the first wall, each conductive probe comprising:
a body section comprising two substantially flat side surfaces and a bottom surface comprising a pad configured to be soldered to a pad coupled to one of the conductive traces of the laminated flexure;
a spring section comprising an elongated arm extending away from the body section, the elongated arm shaped to make conductive contact with a pad positioned on the trailing face of the read head; and
a non-conductive adhesive layer attached to at least one of the two side surfaces,
wherein each of the plurality of the conductive probes is attached to an adjacent one of the conductive probes by one of the adhesive layers.

15. The cavity gimbal assembly of claim 14, wherein each of the conductive probes is separated from an adjacent one of the conductive probes by a spacer.

16. The cavity gimbal assembly of claim 14:
wherein the probe assembly is attached to the first wall such that the spring section of each probe extends away from the first wall.

17. The cavity gimbal assembly of claim 14:
wherein the cavity probe assembly comprises a second cantilevered clamping arm having a second arm supported end and a second arm distal end, the second cantilevered clamping arm being sized so that the second arm distal end is positioned to contact the leading face of the read head.

18. The cavity gimbal assembly of claim 17:
wherein the rectangularly shaped opening comprises an open top, a bottom, two long side walls, and the first wall positioned opposite to the first and second distal ends of the first and second cantilevered clamping arms.

19. The cavity gimbal assembly of claim 14, wherein the body section of each of the probes comprises an opening configured to receive an alignment shaft.

20. The cavity gimbal assembly of claim 19, wherein the openings of the probes comprise a circular shape.

21. The cavity gimbal assembly of claim 14, wherein each of the probes is soldered to the laminated flexure.

22. The cavity gimbal assembly of claim 14, further comprising two conductive end probes each comprising a rectangularly shaped body having a protrusion configured to make to make electrical contact with a pad on a trailing face of the read head, wherein each conductive end probe is attached to an end of the plurality of conductive probes.

23. The cavity gimbal assembly of claim 14, wherein the elongated arm comprises an end having a curved shape, the end configured to make the conductive contact with the pad on a trailing face of the read head.

\* \* \* \* \*